May 5, 1964 R. F. THIELMAN 3,131,537
RADIALLY MOVABLE AXIALLY SUPPORTED PLUG NOZZLE
Filed June 21, 1961 2 Sheets-Sheet 1
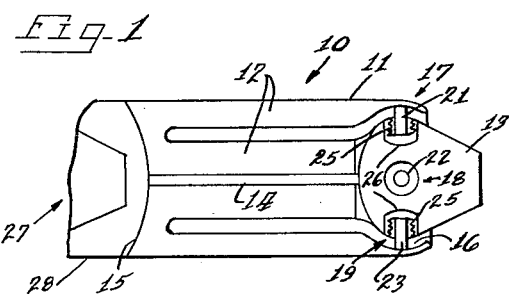
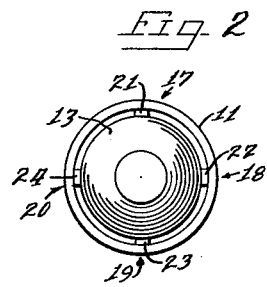
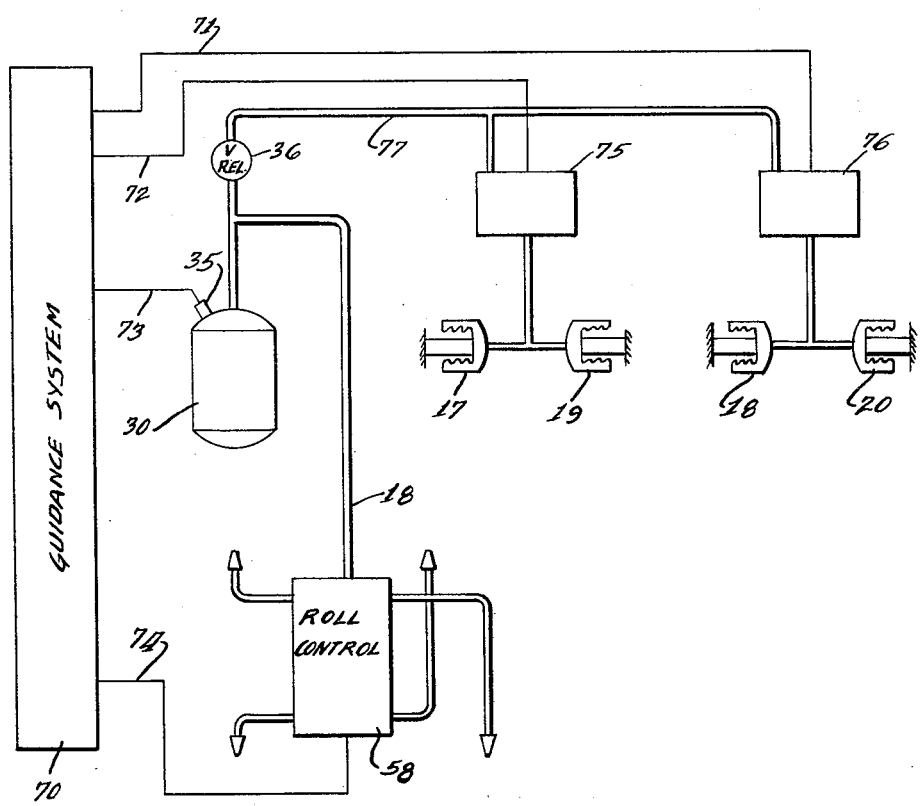
INVENTOR.
Russell F. Thielman
BY
ATTORNEYS May 5, 1964  R. F. THIELMAN  3,131,537
RADIALLY MOVABLE AXIALLY SUPPORTED PLUG NOZZLE
Filed June 21, 1961  2 Sheets-Sheet 2
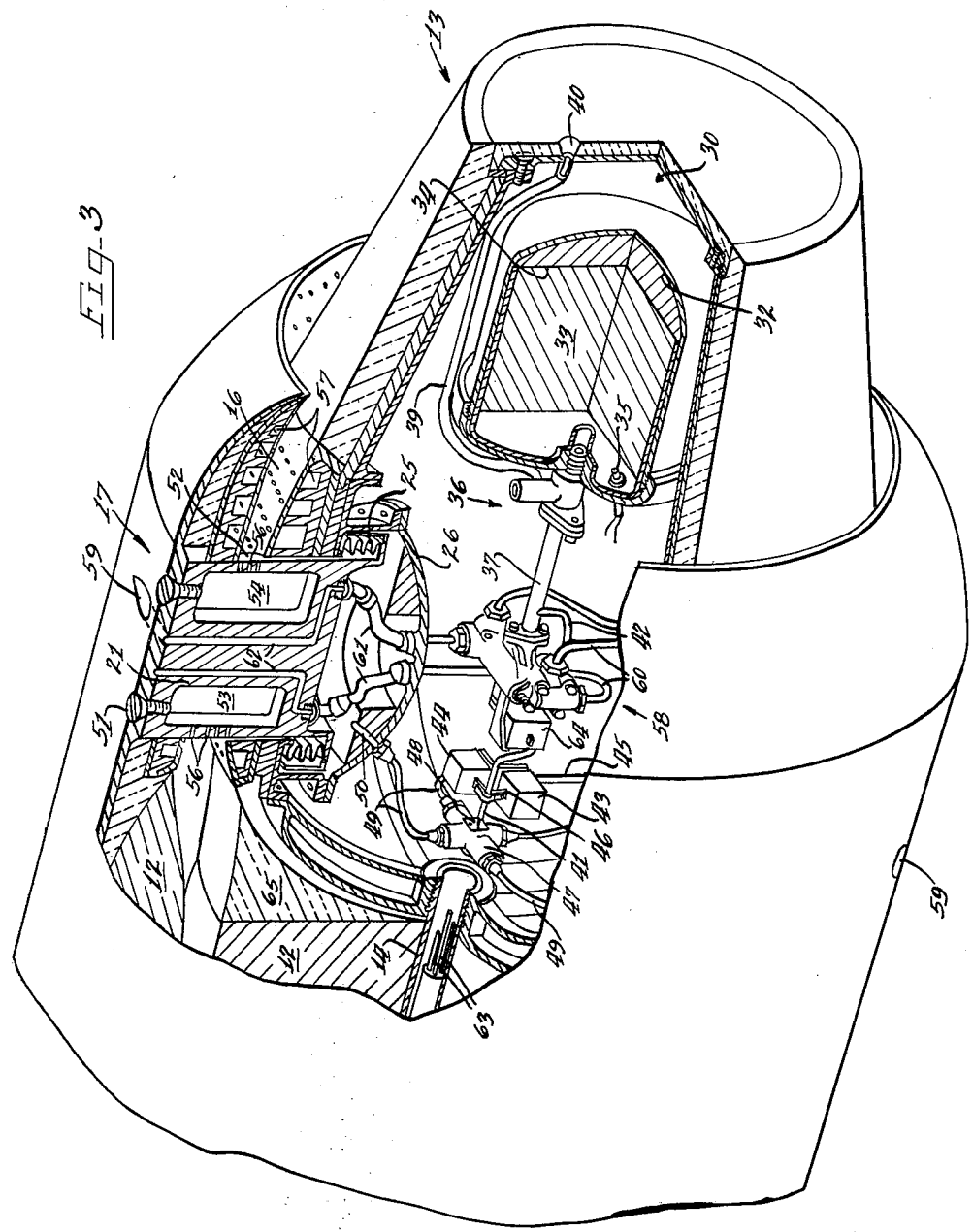
INVENTOR.
Russell F. Thielman
BY
ATTORNEYS

United States Patent Office 3,131,537
Patented May 5, 1964

3,131,537
RADIALLY MOVABLE AXIALLY SUPPORTED PLUG NOZZLE
Russell F. Thielman, Cleveland, Ohio, assignor to Thompson Ramo Wooldridge Inc., Cleveland, Ohio, a corporation of Ohio
Filed June 21, 1961, Ser. No. 118,591
9 Claims. (Cl. 60—35.54)

This invention relates to air and space borne vehicles, such as missiles, rockets, satellites, nose cones and the like, and is more particularly directed to improved methods and means for propelling and controlling the attitude of such a vehicle in flight.

Solid propellant rockets are usually guided by deflecting the thrust vector in order to maintain proper attitude and path control. Swivel nozzles, rotatable nozzles, jet vanes, and jetavators have been used to control the direction of the thrust vector in many instances.

When conventional convergent-divergent nozzles are used, the two phase rocket exhaust flow causes difficulty because these nozzles must be relatively long in order to extract maximum energy from the exhaust. One difficulty is the fact that length penalty is incurred which can be quite large for multi-staged vehicles. Additionally, a weight penalty is involved, particularly in the interstage structure which must be long enough to accommodate the nozzle length requirements.

Conventional convergent-divergent rocket nozzles have a further disadvantage in that they operate at full efficiency at only one back pressure or altitude condition. Accordingly, when a rocket climbs from a low to a high pressure altitude, the nozzle will operate at design pressure ratio (assuming constant chamber pressure) at only one point. At all other altitudes, the flow will be either under or over expanded and full engine thrust will not be attained.

Increased performance requirements have stimulated the development of nozzles which are capable of operating at high efficiency over a wider range of back pressures. The plug nozzle is a type that is designed to expand rocket gases efficiently over a wide range of altitudes. In addition, plug nozzles have the advantage that they can be cut off short with virtually no loss in efficiency, so that no length penalty is involved. The use of plug nozzles requires different means of achieving thrust vector control, however.

Accordingly, it is a general object of this invention to provide unique methods and means for controlling the thrust vector of rockets that employ plug nozzles.

It is another object of this invention to achieve thrust vector control wherein the total throat area of the nozzle remains constant so that the rocket exhaust weight flow remains unchanged.

It is another object of this invention to provide method and apparatus for controlling the attitude of air and space borne vehicles in the pitch, yaw and roll planes.

These and other objects of the invention are attained by providing a system that includes a plug nozzle that is formed by an annular wall member and a substantially coaxial plug member mounted within the wall member. Actuating means are provided which couple the plug member to the wall member in such a manner that the plug member can be moved in radial directions while being held stationary in the axial direction. A control means is also provided which is responsive to the guidance system for the vehicle and which acts to vary the setting of the actuating means in order to change the radial position of the plug member relative to the annular wall member.

It is apparent that if the plug is radially deflected, the throat area of the nozzle is reduced on one side while it is increased on the opposite side. On the side of the plug where the throat area is reduced, less weight flow is exhausted and less thrust is produced, while the opposite action occurs on the other side of the plug. Therefore, a thrust couple is formed about the longitudinal axis of the missile which causes rotation of the missile about its center of gravity. In addition, the system achieves roll control by two pairs of roll control nozzles.

The system includes further novel features in that the radially movable plug nozzle is supported by an axial tube which is able to stand full engine pressure. Axial movement of the plug is prevented by the forward motor closure which is fashioned as a reversed ellipsoid which, under pressure, deflects in a direction opposite to that of the axial tube. The result is that the plug, in effect, remains stationary under full engine pressure.

This invention may be better understood and other objects, features and advantages may be more apparent from the following detailed description taken in conjunction with the accompanying figures of the drawings, wherein like reference numerals refer to like parts, in which:

FIGURE 1 is an elevational view partially in section of an air or space borne vehicle constructed in accordance with the invention;

FIGURE 2 is an end view of the vehicle illustrated in FIGURE 1;

FIGURE 3 is an enlarged view of a portion of the vehicle with some parts broken away to show underlying parts; and FIGURE 4 is a schematic diagram of the control system for the vehicle.

As shown on the drawings:

The vehicle illustrated in FIGURE 1 includes a rocket motor 10 that includes a cylindrical motor case 11 and a coaxial plug member 13. The plug member 13 is supported by an axially extending tube 14 which is fastened to the forward motor closure 15. This closure 15 is formed as a reversed ellipsoid which, under pressure, deflects in a direction opposite to that of the axial tube 14, with the result that the plug member 13 remains stationary even under full engine pressure.

A suitable solid propellant charge 12 is supported in the motor between the casing and the tube. The annular space 16 between the outer surface of the plug member 13 and the inner surface of the motor case 11 forms the annular throat for the nozzle.

The plug member 13 is moved radially relative to the motor case 11 by four actuators 17–20. These actuators include stationary pistons 21–24 which are fastened at their outer ends to the motor case 11 and at their inner ends to a circular bellows seal 25, two of which are shown in FIGURE 1. The outer ends of the seals 25 are fastened to rigid actuator housings 26 which in turn are fastened to the plug member 13.

It is apparent that if a source of pressurized fluid such as gas is connected to the interior of the four actuator housings and if a pressure differential exists between two opposing actuators, the plug member 13 will be caused to move radially relative to the motor case 11. For example, if the pressure within the housing for the actuator 19 is at atmospheric pressure while the pressure within the housing of the actuator 17 is at a pressure substantially above atmospheric, the housing 26 for the actuator 17 will be forced downwardly, and it will pull the plug 13 with it as the bellows seal 25 contracts.

When the plug member 13 moves downwardly the throat area on the upper surface of the plug member 13, as shown in FIGURE 1, increases while the throat area on the under surface of the plug member 13 decreases. Accordingly, a thrust couple is formed about the longitudinal axis of the missile which causes rotation of the missile in the counterclockwise direction, as seen in FIGURE 1 about its center of gravity.

The rocket motor illustrated in FIGURE 1 may be the first stage which may be connected to a substantially similar motor 27 by a releasable band 28. Conventional means may be employed to couple the two stages together and to release them at an appropriate moment.

With specific reference to FIGURE 3, the four actuators 17–20 are energized by a hot gas generator 30 which is connected to the four actuators through a control mechanism 31. The generator 30 produces a volume of gas under pressure and the control mechanism 31, which is under the command of the guidance system, directs the flow of the gas to one of the four actuators and causes the pressure within one of the four actuator housings to build up as compared to the other actuator housings. As previously stated, this differential pressure causes the plug member 13 to move radially relative to the motor case 11 and change the direction of the thrust vector.

The hot gas generator 30 is mounted within the plug member 13 and includes a housing 32 that encloses a suitable end burning solid propellant 33 and an end cap 34. A suitable igniting member such as a squib 35 is mounted on the housing 32 in communication with the reaction chamber within the housing.

A relief valve assembly 36 is threaded into the housing 32 with its inlet end in communication with the reaction chamber and its outlet connected to a conduit 37. When the gas pressure exceeds a predetermined upper limit, a portion of the gas is discharged through an over board vent line 39 which is connected to a nozzle 40.

The conduit 37 is connected to a jet pipe 41 by a line 42 that connects to the conduit 37. The position of the jet pipe 41 is controlled by two torque motors 43 and 44 which are mounted on a stand 45 and connected to the jet pipe 41 by a brace 46. The torque motor 43 controls the position of the jet pipe 41 in a first plane, which is vertical as seen in FIGURE 3, and the second torque motor 44 controls the position of the jet pipe 41 in a second plane which is perpendicular to the first plane and is horizontal as seen in FIGURE 3.

A receiver block 47 is positioned adjacent the outlet of the jet pipe 41 and has four orifices 48 formed in it. Each one of the four orifices 48 is connected to the interior of one of the four actuator housings 26 by four conduits 49.

The actuator 17 includes a housing 26 that is coupled to the conduit 49 at the point 50, and is fixed to the upper end of a bellows seal 25. The lower end of the bellows seal 25 is fixed to a stationary actuator piston 21 which is fixed to the motor case 11 by suitable means 51. Since the housing 26 is fixed to the plug member 13, it is apparent that if the jet pipe 41 is positioned adjacent the uppermost orifice 48, the gas issuing from the generator 30 will cause a pressure increase between the housing 26 and the piston 21 which will force the housing 26 downwardly as seen in FIGURE 3 away from the stationary piston 21. Since the housing 26 is fixed to the plug member 13, the plug member will also move downwardly and change the direction of the thrust vector.

It should be understood that while the jet pipe 41 is positioned adjacent one orifice and pressure builds up in its associated actuator housing, all other orifices and actuators are simultaneously bled down to atmospheric pressure. This difference in the atmospheric pressure on the one hand and the pressure build-up in the selected actuator housing causes the radial deflection of the plug member 13.

The stationary piston member 21 may be circular or generally oblong in shape. It can be seen that a portion 52 of the piston member between the plug member 13 and the case 11 is exposed to the hot rocket gases. Cooling is provided at the leading and trailing edges of the piston member 21 by forming hollow cavities 53 and 54 inside of the piston member and filling these two cavities with a coolant material. This coolant material should be a type that is heated by the heat transferred into the piston from the rocket gases, and this coolant absorbs heat as it rises to boiling temperature. When the coolant reaches an equilibrium condition, the amount of vapor being boiled off equals the amount of vapor allowed to escape through a plurality of orifices 56 formed in the leading and trailing edges of the piston 21 and provides boundary layer cooling.

This same cooling concept is employed to cool the throat section of the nozzle. The portion of the plug member 13 adjacent the throat section 16 and the portion of the motor case 11 adjacent the throat section are both formed with a plurality of cavities 57 which are filled with a coolant material. Once again a plurality of apertures are formed in the cover for the plug member and in the motor case which place the throat section of the nozzle in communication with the cavities 57 and provide cooling in the manner previously described.

A slight clearance is provided between the stationary piston 21 and the sides of the plug member to allow for plug movement at the actuators, and this gap between the actuator pistons and the plug is preferably filled with a silicone grease to minimize heat transfer.

The system illustrated in FIGURE 3 also includes a roll control mechanism. This mechanism includes a roll control valve 58 which directs gases from the gas generator 30 to one of two pairs of roll control nozzles 59. The roll control valve 58 is a conventional type that is adapted to receive the gases from the generator through the conduit 37 and direct the flow of the gases to two sets of conduits 60 which in turn are connected to flexible tubes 61. These tubes 61 run between the actuator housing 26 and passageways 62 formed in the stationary pistons 21. The flow of the gases from the generator to the nozzles 59 serves an additional purpose when passing through the passageways 62 in that they provide additional cooling for the exposed surfaces of the actuator pistons 21.

Electrical connections to the vehicle guidance system are made by means of a plurality of conductors 63 that run through the center of the tube 14. These conductors connect to the torque motors 43 and 44, the torque motor 64 for the roll control valve 58, the squib 35, and any other element requiring control.

A conventional solid propellant 12 is cast as a cylinder around the axial tube 14 and as a tube cast to the inner surface of the motor case 11. The burning area, therefore, consists of the surface of both faces of the propellant grain, the flow cross-section being annular.

The spherical face of the plug member 13 is protected from the erosive burning gases by an inert insulator 65. As the solid propellant cast on the axial tube 14 burns, the insulator 65 ablates away, its surface receding towards the longitudinal center of the missile at approximately the same rate as that of the propellant 12.

Conventional nozzle materials are employed in the design. The throat sections are preferably fabricated from high temperature refractory alloys backed by graphite, and ablation resistent plastic is used for other exposed surfaces.

The control system for the system described is illustrated in FIGURE 4. The control includes a conventional guidance system 70 which sends electrical control signals over a plurality of electrical conductors 71–74, which correspond to the conductors 63 shown in FIGURE 3. The conductor 73 is connected to energize the squib 35 in the hot gas generator 30, and the conductors 71 and 72 are connected to control the operation of two servos 75 and 76 which in turn control the gases flowing from the generator 30 through a conduit 77. The servo 75 may be the pitch servo and the two actuators 17 and 19 may be the pitch-up and pitch-down actuators, and the servo 76 may be the yaw servo and the two actuators 18 and 20 may be the yaw right and yaw left actuators.

The electrical conductor 74 carries control signals to the roll control valve 58 which controls the flow of gases from the generator 30 over the line 78 to the four roll control nozzles 59.

It is apparent that a novel and useful system for controlling the attitude of air and space borne vehicles has been provided. The system provides a unique means of controlling the thrust vector when a plug type nozzle is being used. The construction is such that the plug member is moved radially in order to control the direction of the thrust vector and the axially supported plug member is able to withstand full engine pressure and remain substantially stationary in the axial direction.

In addition to means for controlling the attitude of the vehicle in the pitch and yaw directions, the system also includes means for controlling the roll of the vehicle about its own axis.

It will be apparent that modifications and variations may be effected without departing from the scope of the novel concepts of the present invention, and it will be understood that the application is to be limited only by the scope of the appended claims.

I claim as my invention:

1. A system adapted to control the attitude of air and space borne vehicles propelled by the thrust produced by exhaust gases generated in a reaction motor and discharging through an exhaust nozzle, the exhaust nozzle being formed by an annular wall member and a substantially coaxial inner plug member, comprising control means responsive to the guidance system for the vehicle, and four actuating means coupling the annular wall member to the plug member, said actuating means being responsive to said control means, one of said actuating means being arranged in each quadrant around said plug member, said four actuating means being adapted to vary the position of the plug member in radial directions relative to the wall member, each of said actuating means including a piston member secured to said annular wall member, a hollow housing fastened to said plug member, a seal means coupling said piston member to said housing, a fluid source, means connecting said fluid source to each of the housings, and means selectively controlling the fluid from said fluid source to the housings.

2. A mechanism adapted to vary the radial position of a plug member in a plug nozzle for air and space borne vehicles, the nozzle including an annular wall member and a substantially coaxial inner plug member, comprising a piston fixed to the annular wall member, a hollow housing fixed to the plug member, a flexible bellows seal coupling said piston member to said housing, and means adapted to be coupled to a source of pressurized fluid, the construction being such that when a pressure is built-up within said hollow housing, said housing is forced away from said piston member.

3. A mechanism adapted to vary the radial position of a plug member in a plug nozzle for air and space borne vehicles, the nozzle including an annular wall member and a substantially coaxial inner plug member defining a throat section therebetween, comprising a piston fixed to the annular wall member, a hollow housing fixed to the plug member, a flexible bellows seal coupling said piston member to said housing, and means adapted to be coupled to a source of pressurized fluid, the construction being such that when a pressure is built-up within said hollow housing, said housing is forced away from said piston member, said actuating means being positioned at substantially the throat section of the nozzle, a plurality of cavities formed within said piston member containing a coolant material, a plurality of orifices formed in the exterior wall of said piston member communicating with the interior of said cavities, and a plurality of fluid passageways formed through said piston member which carry gas under pressure from a gas generator to a plurality of tangentially directed roll control nozzles.

4. A system adapted to control the attitude of air space borne vehicles propelled by the thrust produced by exhaust gases generated in a reaction motor and discharging through an exhaust nozzle, the nozzle being formed by an annular wall member and a substantially coaxially inner plug member defining a throat section for said nozzle, comprising at least one actuator member that is adapted to move the plug member in radial directions relative to the annular wall member, said actuator including a piston fixed to the annular wall member at the throat section of the nozzle, a hollow housing fixed to the plug member, a flexible bellows seal coupling said piston to said housing, a block having at least one inlet orifice and at least one outlet conduit in communication with said inlet orifice, said outlet conduit being connected to the interior of said hollow housing, and means adapted to selectively inject gas under pressure into said inlet orifice in said block, and means for supplying pressurized gas to said last named means.

5. A system adapted to control the attitude of air space borne vehicles propelled by the thrust produced by exhaust gases generated in a reaction motor and discharging through an exhaust nozzle, the nozzle being formed by an annular wall member and a substantially coaxially inner plug member defining an annular throat therebetween comprising at least one actuator member that is adapted to move the plug member in radial directions relative to the annular wall member, said actuator including a piston fixed to the annular wall member at the throat section of the nozzle, a hollow housing fixed to the plug member, a flexible bellows seal coupling said piston to said housing, a block having at least one inlet orifice and at least one outlet conduit in communication with said inlet orifice, said outlet conduit being connected to the interior of said hollow housing, and means adapted to selectively inject gas under pressure into said inlet orifice in said block, said last named means including a jet pipe that is coupled to a hot gas generator, and at least one torque motor coupled to said jet pipe for varying the position of said jet pipe relative to said inlet orifice.

6. A system adapted to control the attitude of air and space bore vehicles propelled by the thrust produced by exhaust gases generated in a reaction motor and discharging through an exhaust nozzle, the exhaust nozzle being formed by an annular wall member and a substantially coaxial plug member, comprising four actuators which couple the plug member to the annular wall member, one of said actuators being mounted in quadrature around said plug member and adapted to radially vary the position of the plug member relative to the annular wall member, each of said actuators including a piston which is fixed to the wall member, a hollow housing fixed to the plug member, a flexible seal coupling said piston member to said housing, a receiver block having four outlet conduits, each of said four outlet conduits being connected to the interior of each of the hollow housings for said four actuators, respectively four inlet orifices formed in said receiver block in communication with said outlet conduits, a jet pipe adjustably mounted adjacent said inlet orifices, means coupled to said jet pipe which is under the control of the vehicle guidance system for varying the position of said jet pipe relative to said inlet orifices, and a hot gas generator having its output connected to said jet pipe.

7. A system adapted to control the attitude of air and space borne vehicle propelled by the thrust produced by exhaust gases generated in a reaction motor and discharging through an exhaust nozzle, the exhaust nozzle being formed by an annular wall member and a substantially coaxial plug member, comprising four actuators which couple the plug member to the annular wall member, one of said actuators being mounted in quadrature around said plug member and adapted to radially vary the position of the plug member relative to the annular wall member, each of said actuators including a piston which is fixed to the wall member, a hollow housing fixed to the plug member, a flexible seal coupling said piston member to said housing, a receiver block having four outlet conduits, each of said four outlet conduits being connected to the interior of each of the hollow housings for said four actuators, respectively, four inlet orifices formed in said receiver block in comunication with said outlet conduits a jet pipe adjustably mounted adjacent said inlet orifices, means coupled to said jet pipe which is under the control of the vehicle guidance system for varying the position of said jet pipe relative to said inlet orifices, and a hot gas generator having its output connected to said jet pipe, a plurality of cavities formed in said piston member and in the throat sections of said plug member and the annular wall member, a plurality of orifices connecting said cavities to the throat area, said cavities containing a coolant material.

8. A system adapted to control the attitude of air and space borne vehicles propelled by the thrust produced by exhaust gases generated in a reaction motor and discharging through an exhaust nozzle, the exhaust nozzle being formed by an annular wall member and a substantially coaxial plug member, comprising four actuators which couple the plug member to the annular wall member, one of said actuators being mounted in quadrature around said plug member and adapted to radially vary the position of the plug member relative to the annular wall member, each of said actuators including a piston which is fixed to the wall member, a hollow housing fixed to the plug member, a flexible seal coupling said piston member to said housing, a receiver block having four outlet conduits, each of said four outlet conduits being connected to the interior of each of the hollow housings for said four actuators, respectively, four inlet orifices formed in said receiver block in communication with said outlet conduits, a jet pipe adjustably mounted adjacent said inlet orifices, means coupled to said jet pipe which is under the control of the vehicle guidance system for varying the position of said jet pipe relative to said inlet orifices, and a hot gas generator having its output connected to said jet pipe, two fluid passageways formed in at least one of said pistons, two flexible conduits connecting said two passageways to couplings formed on said housing, said couplings being connected by tubes to a roll control mechanism, said roll control mechanism being adapted to receive gases from said gas generator and direct the gases through said tubes to said passageways formed in said pistons and two roll control nozzles formed in the outer surface of the annular wall member.

9. A reaction motor having an exhaust nozzle for propelling air and space borne vehicles and having means for controlling the direction of the thrust vector comprising a substantially cylindrical motor casing, a forward motor closure for said casing which is fashioned as a reversed ellipsoid, a tube fastened to said forward motor closure which runs down the center of said motor casing, a plug member, means connecting said plug member to said tube to restrain axial movement of said plug member, said plug member being substantially coaxial with said motor casing and forming an exhaust nozzle in the annular space between them, and a plurality of actuating means coupling said plug member to said motor casing in such a manner as to vary the position of said plug member radially relative to said motor casing in order to change the direction of the thrust vector, said actuating means including a plurality of pistons which are fastened to said motor casing and extend into the interior of said plug member at substantially the throat section of said motor, a housing fastened to the interior of said plug member around the end of said piston, a flexible bellows seal coupling said housing to said piston, means for generating hot gases, and means coupling the hot gas generating means to the interior of said housing.

References Cited in the file of this patent
UNITED STATES PATENTS

| | | |
|---|---|---|
| 2,354,151 | Skoglund | July 18, 1944 |
| 2,702,986 | Kadosch et al. | Mar. 1, 1955 |
| 2,838,909 | Meulien | June 17, 1958 |
| 2,981,061 | Lilligren | Apr. 25, 1961 |
| 2,981,273 | Callender et al. | Apr. 25, 1961 |
| 3,040,523 | Price | June 26, 1962 |